United States Patent
Kapadia et al.

(10) Patent No.: US 11,015,475 B2
(45) Date of Patent: May 25, 2021

(54) PASSIVE BLADE TIP CLEARANCE CONTROL SYSTEM FOR GAS TURBINE ENGINE

(71) Applicants: Rolls-Royce Corporation, Indianapolis, IN (US); Rolls-Royce North American Technologies Inc., Indianapolis, IN (US)

(72) Inventors: Behram Kapadia, McCordsville, IN (US); Jack Moody, Indianapolis, IN (US); Ryan C. Humes, Indianapolis, IN (US); Brandon R. Snyder, Greenwood, IN (US)

(73) Assignees: Rolls-Royce Corporation, Indianapolis, IN (US); Rolls-Royce North American Technologies Inc., Indianapolis, IN (US)

(*) Notice: Subject to any disclaimer, the term of this patent is extended or adjusted under 35 U.S.C. 154(b) by 92 days.

(21) Appl. No.: 16/233,964

(22) Filed: Dec. 27, 2018

(65) Prior Publication Data

US 2020/0208533 A1 Jul. 2, 2020

(51) Int. Cl.
| | |
|---|---|
| *F01D 11/18* | (2006.01) |
| *F02C 9/18* | (2006.01) |
| *F01D 25/12* | (2006.01) |
| *F02K 3/06* | (2006.01) |
| *F01D 19/02* | (2006.01) |

(52) U.S. Cl.
CPC .............. *F01D 11/18* (2013.01); *F01D 25/12* (2013.01); *F02C 9/18* (2013.01); *F02K 3/06* (2013.01); *F01D 19/02* (2013.01); *F05D 2220/323* (2013.01); *F05D 2220/3212* (2013.01); *F05D 2240/11* (2013.01); *F05D 2260/606* (2013.01); *F05D 2270/42* (2013.01)

(58) Field of Classification Search
CPC ................................. F01D 11/24; F01D 11/18
See application file for complete search history.

(56) References Cited

U.S. PATENT DOCUMENTS

| | | | |
|---|---|---|---|
| 3,742,705 A | 7/1973 | Sifford | |
| 3,814,313 A * | 6/1974 | Beam, Jr. ............. | G05D 23/275 236/93 R |

(Continued)

FOREIGN PATENT DOCUMENTS

| | | |
|---|---|---|
| EP | 1004759 A2 | 5/2000 |
| EP | 1630385 A2 | 3/2006 |

(Continued)

OTHER PUBLICATIONS

European Search Report for Application No. 19211684.6-1004, dated Mar. 9, 2020, 7 pages.

*Primary Examiner* — Justin D Seabe
(74) *Attorney, Agent, or Firm* — Barnes & Thornburg LLP

(57) ABSTRACT

The present disclosure relates to a gas turbine engine including a turbine wheel mounted for rotation about a central axis and a turbine shroud ring mounted radially outward from the turbine wheel. The turbine wheel includes a plurality of blades that are spaced apart radially from the turbine shroud ring to establish a blade tip clearance gap. The gas turbine engine further includes a blade tip clearance control system that passively controls the size of the clearance gap based on engine operation.

19 Claims, 4 Drawing Sheets

(56) References Cited

U.S. PATENT DOCUMENTS

| | | | |
|---|---|---|---|
| 4,023,919 A * | 5/1977 | Patterson | F01D 11/18 |
| | | | 415/134 |
| 4,329,114 A | 5/1982 | Johnston et al. | |
| 4,683,716 A | 8/1987 | Wright et al. | |
| 5,018,942 A | 5/1991 | Ciokajlo et al. | |
| 5,064,343 A | 11/1991 | Mills | |
| 5,104,287 A | 4/1992 | Ciokajlo | |
| 5,116,199 A | 5/1992 | Ciokajlo | |
| 5,211,534 A | 5/1993 | Catlow | |
| 5,772,400 A | 6/1998 | Pellow | |
| 5,915,919 A * | 6/1999 | Taillant | F01D 11/24 |
| | | | 415/115 |
| 5,993,150 A | 11/1999 | Liotta et al. | |
| 6,126,390 A | 10/2000 | Bock | |
| 6,227,800 B1 * | 5/2001 | Spring | F01D 11/24 |
| | | | 415/116 |
| 6,925,814 B2 | 8/2005 | Wilson et al. | |
| 7,070,387 B2 * | 7/2006 | Crozet | F01D 11/24 |
| | | | 415/173.1 |
| 7,588,414 B2 | 9/2009 | Wunderlich et al. | |
| 7,708,518 B2 | 5/2010 | Chehab | |
| 7,785,063 B2 | 8/2010 | McQuiggan et al. | |
| 8,126,628 B2 | 2/2012 | Hershey et al. | |
| 8,668,431 B2 | 3/2014 | Rog et al. | |
| 8,721,257 B2 | 5/2014 | Lewis et al. | |
| 9,316,111 B2 | 4/2016 | Eleftheriou et al. | |
| 9,644,490 B2 | 5/2017 | Joe et al. | |
| 9,784,117 B2 | 10/2017 | Duguay et al. | |
| 2005/0109016 A1 | 5/2005 | Ullyott | |
| 2011/0206502 A1 * | 8/2011 | Rulli | F01D 25/145 |
| | | | 415/177 |
| 2012/0167588 A1 | 7/2012 | Dierksmeier et al. | |
| 2015/0003958 A1 | 1/2015 | Uskert et al. | |
| 2016/0169026 A1 | 6/2016 | Jones | |
| 2016/0169027 A1 | 6/2016 | Jones | |
| 2017/0167273 A1 | 6/2017 | Maguire et al. | |
| 2017/0321568 A1 | 11/2017 | Werkheiser et al. | |

FOREIGN PATENT DOCUMENTS

| | | |
|---|---|---|
| EP | 3176382 | 6/2017 |
| WO | 2004097181 A1 | 11/2004 |
| WO | 2015094990 | 6/2015 |

* cited by examiner

PASSIVE BLADE TIP CLEARANCE CONTROL SYSTEM FOR GAS TURBINE ENGINE

FIELD OF THE DISCLOSURE

The present disclosure relates generally to a gas turbine engine including a blade tip clearance control system. More particularly, the present disclosure relates to a passive blade tip clearance control system.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in rotating blades of the turbine. A blade track or other structure arranged radially outward of the rotating blades may block combustion products from passing over the blades without causing the blades to rotate, thereby contributing to lost performance within the gas turbine engine. Excessive contact between the rotating blades and the blade track during engine operation may cause degradation of the blades. Excessive clearance between the rotating blades and the blade track may cause unacceptable efficiencies of the gas turbine engine. In view of the above considerations, managing clearance between the blade track and the rotating blades remains an area of interest.

SUMMARY

The present disclosure may comprise one or more of the following features and combinations thereof.

A gas turbine engine, in accordance with the present disclosure, includes a compressor, a combustor, and a turbine. The compressor is configured to pressurize air moving along a primary gas path of the gas turbine engine. The combustor is fluidly coupled to the compressor to receive pressurized air discharged from the compressor and configured to ignite fuel mixed with the pressurized air. The turbine includes (i) a high-pressure section fluidly coupled to the combustor to receive combustion gases generated by fuel burned in the combustor and (ii) a low-pressure section fluidly coupled to receive the combustion gasses exiting the high-pressure section.

In illustrative embodiments, the high-pressure section includes a turbine wheel mounted for rotation about a central reference axis, a variable-diameter turbine shroud ring that extends around the turbine wheel, and a passive blade-tip clearance control system. The passive blade tip clearance control system includes a shroud-ring support coupled to the variable-diameter turbine shroud ring that is configured to drive motion of the turbine shroud ring radially inward or outward based on temperature of the shroud-ring support and defining at least in part a cavity located radially outward of the variable-diameter turbine shroud ring.

In illustrative embodiments, the cavity is fluidly coupled to a bleed-air passageway that extends from the compressor to the cavity without interruption from a valve and a cooling-air passageway that extends from the cavity to the low pressure section such that pressurized bleed air from the compressor is conducted to the cavity of the passive blade tip clearance control system so that the temperature and motion of the shroud-ring support is controlled based on the operating conditions of the engine without active control of the pressurized bleed air provided to the cavity.

In illustrative embodiments, the passive blade tip clearance control system further includes an outer case and the shroud-ring support is provided by an inner case mounted radially-inward of the outer case to define the cavity radially therebetween.

In illustrative embodiments, the passive blade tip clearance control system further includes an inlet conduit coupled to the outer case and opening into the cavity and an outlet, the inlet configured to conduct the bleed air from the compressor into the cavity and the outlet configured to conduct the bleed air from the cavity to the low pressure section of the turbine.

In illustrative embodiments, the passive blade-tip clearance control system is configured to heat the inner case during start-up conditions of the gas turbine engine and is configured to cool the inner case during cruise conditions.

In illustrative embodiments, the cavity formed between the outer case and the inner case is sealed off from a gas path of the high pressure section of the turbine such that the temperature of gases within the cavity controls the gap while allowing for pressure within the cavity to be less than pressure within the primary gas path of the high pressure turbine section.

In illustrative embodiments, the outer case includes an annular duct that extends circumferentially around the reference axis and defines a manifold and the inlet is fluidly coupled to the manifold.

In illustrative embodiments, the passive blade tip clearance control system includes a plurality of inlet conduits fluidly coupled to the manifold and spaced apart circumferentially around the reference axis and a plurality of outlets spaced apart circumferentially around the reference axis that extend through the manifold and are offset from each inlet conduit.

In illustrative embodiments, the high pressure section of the turbine includes a first turbine blade stage, a second turbine blade stage axially aft of the first turbine blade stage, and a vane stage axially between the first and second turbine blade stages. The passive blade tip clearance control system is configured to control a gap radially between second turbine blade stage and the turbine shroud ring.

In illustrative embodiments, the outer case includes an outer panel spaced apart from the central reference axis a first distance and an inner panel spaced apart from the central reference axis a second distance that is less than the first distance.

In illustrative embodiments, the inner panel is positioned radially outward of the second turbine blade stage such that the cavity is narrowed outward of the second turbine blade stage.

In illustrative embodiments, the outer panel is spaced apart axially from the inner panel.

In illustrative embodiments, the inner panel is adjustable axially to target additional turbine blade stages included in the high pressure section of the turbine.

In illustrative embodiments, the inner case includes a plurality of turbulators coupled to an upper surface of the inner case within the cavity radially outward of the second turbine blade stage to increase heat transfer between the bleed air and the inner case directly outward of the second turbine blade stage.

In illustrative embodiments, the inner case includes a panel that is coupled to the turbine shroud ring and a flange coupled to an axially-forward end of the panel, the flange coupled to the outer case and having a U-shape when viewed circumferentially so that the flange is configured to flex as the inner case moves radially inward and outward relative to the outer case.

According to another aspect of the present disclosure, a high pressure turbine section for use in a gas turbine engine includes a turbine wheel mounted for rotation about a central reference axis, a plurality of blades that extend radially outward from the turbine wheel to interact with gases moving through a primary gas path of the turbine section, a variable-diameter turbine shroud ring that extends around the turbine wheel to define a radially-outer boundary of the primary gas path, and a passive blade-tip clearance control system.

In illustrative embodiments, the passive blade tip clearance control system is configured to drive motion of the turbine shroud ring radially inward and outward relative to the central reference axis to control size of a gap radially between the turbine wheel and the variable-diameter turbine shroud ring, the passive blade-tip clearance control system including an outer case and an inner case mounted radially-inward of the outer case to define a cavity radially therebetween. The cavity formed between the outer case and the inner case is sealed off from the primary gas path within the high pressure turbine section.

These and other features of the present disclosure will become more apparent from the following description of the illustrative embodiments.

DETAILED DESCRIPTION

Figure 1:
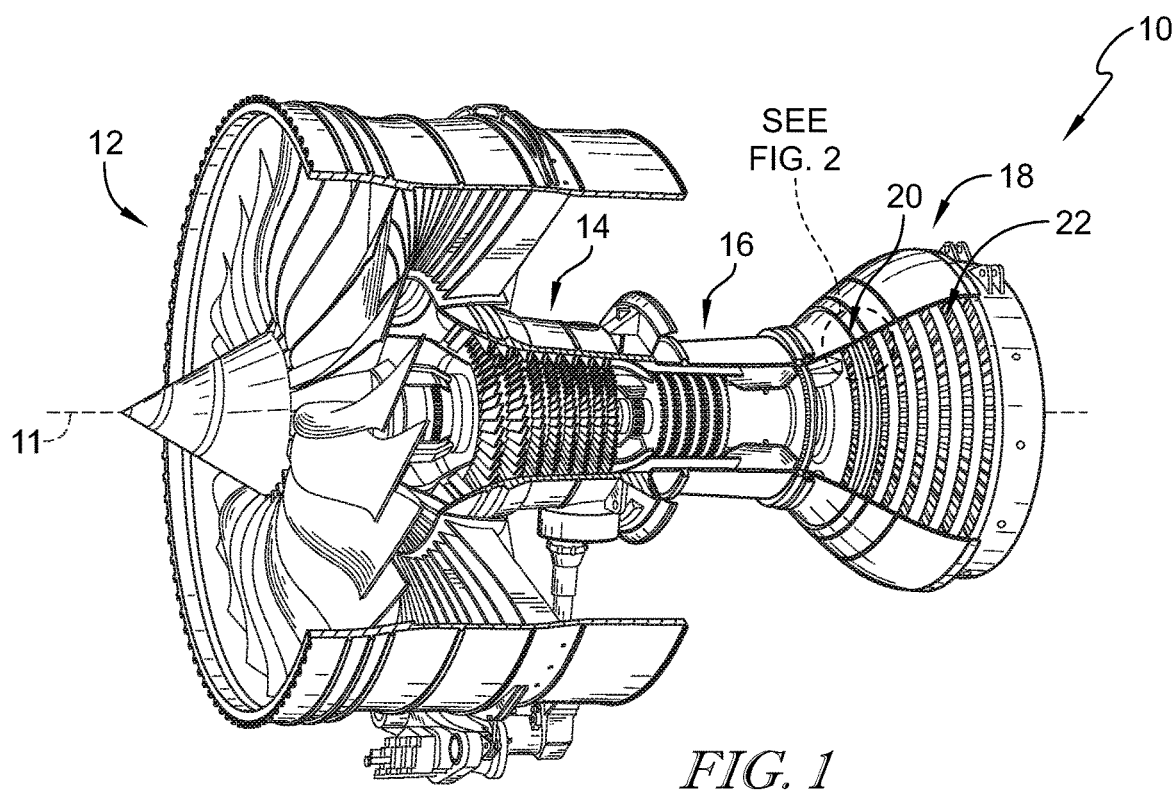
FIG. 1 is a perspective view of a gas turbine engine including a passive blade tip clearance control system integrated into a turbine of the engine as shown in FIG. 2, the passive blade tip clearance system being configured to conduct pressurized bleed air from a compressor of the engine to a high-pressure section of the turbine to control blade tip clearance in the high-pressure section without interruption from valves or other active control devices.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central reference axis 11 and drive the compressor 14 and the fan 12.

The turbine 18 includes a high-pressure section 20 fluidly coupled to the combustor 16 to receive combustion gases generated by fuel burned in the combustor and a low-pressure section 22 fluidly coupled to receive the combustion gasses exiting the high-pressure section 20. In other embodiments, the turbine 18 may further include one or more intermediate sections between the high pressure section 20 and the low pressure section 22.

Figure 2:
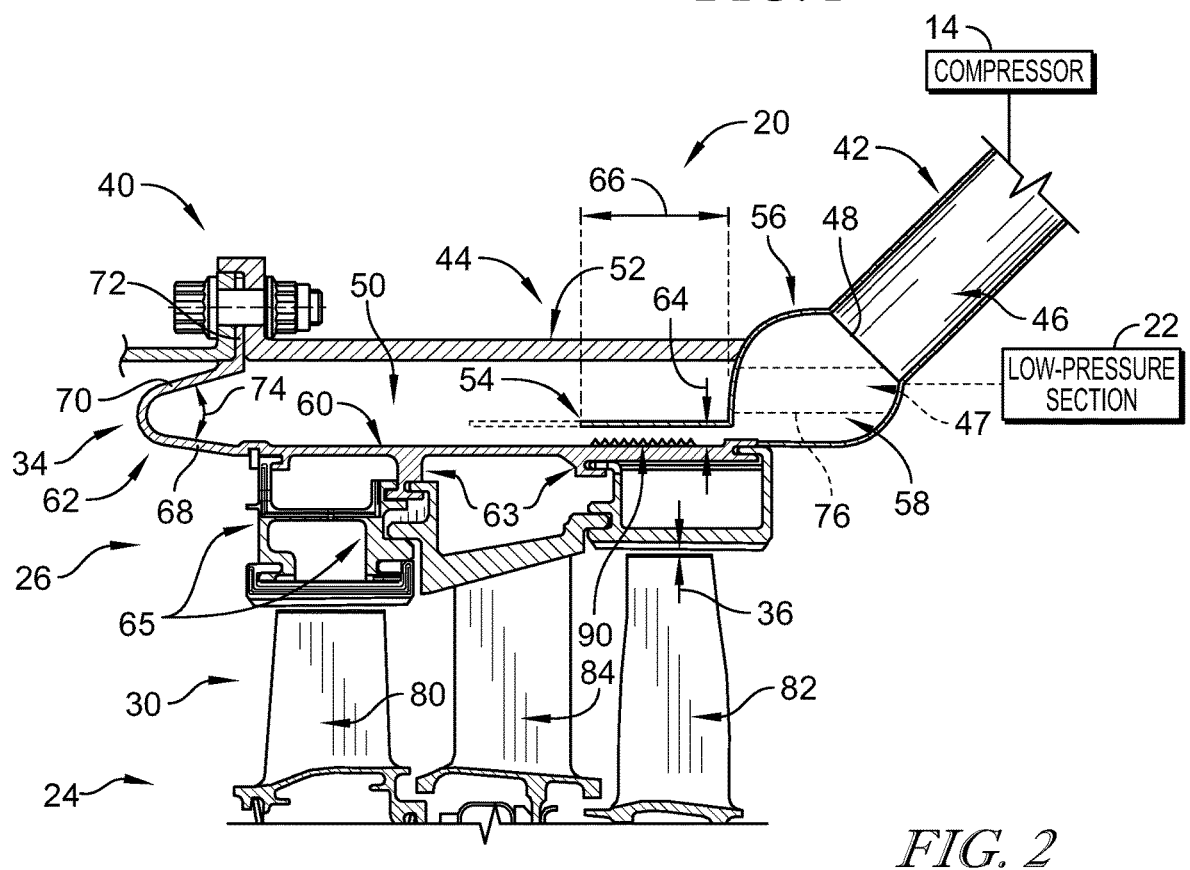
FIG. 2 is a cross sectional view of the high-pressure section of the turbine showing that the passive blade tip clearance control system includes an outer case and an inner case that cooperate to define a cavity, and showing that the cavity is configured to receive the bleed air from the compressor to drive movement of the inner case radially inward or outward depending on operating conditions of the engine to control blade tip clearance.

The high-pressure section 20 includes a turbine wheel 24 mounted for rotation about the central reference axis 11, a variable-diameter turbine shroud ring 26 that extends around the turbine wheel 24, and a plurality of blades 30 mounted to the turbine wheel 24 as shown in FIGS. 1 and 2. The blades 20 are configured to interact with the hot gases in the gas path to cause rotation of the turbine wheel 24. The turbine shroud ring 26 is coupled to a shroud ring support 34 radially outward from the blades 30 to provide a radially outer boundary of the gas path. Each of the blades 30 is spaced apart from the turbine shroud ring 26 by a clearance gap 36 that is defined between a tip of each blade 30 and the turbine shroud ring 26.

During operation of the gas turbine engine, the hot gases may cause various components within the turbine 18 to expand in response to the higher temperatures caused by the combustion of the pressurized air. One such component that may undergo thermal expansion is the shroud-ring support 34. For example, the shroud ring support 34 may have a first diameter under start-up conditions and a second diameter under operating conditions that is greater than the first diameter due to the increased temperature of the engine after a period of time of operation. Similarly, the turbine wheel 24 may have a first diameter under start-up conditions and a second diameter under operating conditions that is greater than the first diameter due to the increased temperature of the engine after a period of time of operation. However, the turbine wheel 24 changes from the first diameter to the second diameter in a shorter period of time than the shroud-ring support 34.

In order to control the gap 36 while the turbine wheel 24 and the shroud-ring support change diameter relative to one another, the high pressure section 20 further includes a passive blade-tip clearance control system 40 that defines a cavity 50 radially outward from the turbine wheel 24 of the high pressure section 20 as shown in FIGS. 1 and 2. The cavity 50 is sealed from the gas path of the turbine 18 such that the temperature of gases within the cavity 50 controls the gap 36 while allowing for pressure within the cavity 50 to be less than pressure within the primary gas path of the high pressure turbine section 20.

During start-up of the gas turbine engine 10, the passive blade tip clearance control system 40 supplies pressurized air having a first temperature to the cavity 50. At this point in time, the temperature of the pressurized air is greater than the temperature of the shroud-ring support 34 to heat the shroud-ring support 34. Heating the shroud-ring support 34 during start-up opens the gap 36 to accommodate the faster change in diameter of the turbine wheel 24. In other words, heating the shroud-ring support 34 during start-up allows the thermal growth of the shroud-ring support 34 to more closely match the thermal growth of the turbine wheel 24.

During operating conditions of the engine 10, such as cruise conditions, the passive blade tip clearance control system 40 supplies the same pressurized air to the cavity 50. However, under operating conditions, after a period of time, the temperature of the shroud-ring support 34 becomes greater than the temperature of the pressurized air. At this point in time the pressurized air cools the shroud-ring support 34 to close the gap 36 and improve efficiencies of the engine 10.

The passive blade tip clearance control system 40 includes an inlet conduit 42, an outer case 44 and the shroud-ring support 34, or inner case 34. The outer case 44 and the inner case 34 define the cavity 50. The inlet conduit 42 defines a bleed-air passageway 46 that is fluidly coupled to the compressor 14 and the cavity 50 without interruption from a valve or any other active blade tip clearance control device. A cooling-air passageway 47 extends from the cavity 50 to the low pressure section 22 of the turbine 18. In this way, the blade tip clearance control system 40 conducts pressurized air from the compressor 14 into the cavity 50 to control blade tip clearance in the high pressure section 20 and then reuses the air downstream of the cavity 50 in the low pressure section 22. Furthermore, the temperature and motion of the shroud-ring support 34 is controlled based on the operating conditions of the engine without active control of the pressurized bleed air provided to the cavity.

Figure 3:
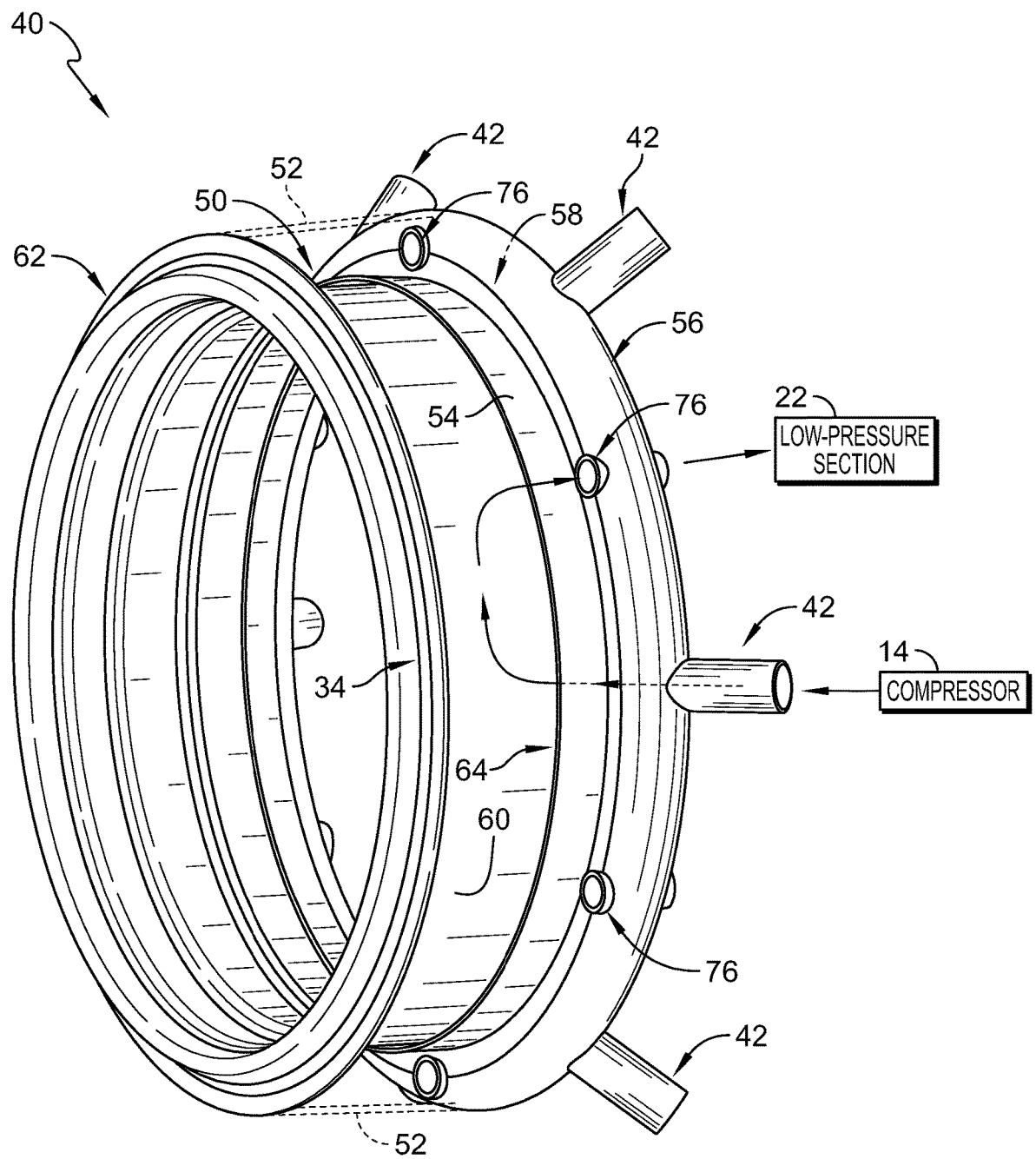
FIG. 3 is a perspective view of the passive blade tip clearance control system of FIGS. 1 and 2 showing that the passive blade tip clearance control system includes a plurality of inlets spaced circumferentially around a central reference axis and a plurality of outlets spaced circumferentially around the reference axis.

The outer case 44 includes an outer panel 52, an inner panel 54 spaced apart radially from the outer panel 52, and an annular duct 56 as shown in FIGS. 2 and 3. The outer panel 52 defines a radially-outer boundary of the cavity 50. The inner panel 54 extends axially forward from the annular duct 56 within the cavity 50 such that the inner panel 54 is spaced apart radially between both the outer panel 52 and the shroud-ring support 34. The annular duct 56 defines a manifold 58 that extends circumferentially around the central reference axis 11 as shown in FIG. 3. The bleed-air passageway 46 has an outlet 48 that opens into the manifold 56 to deliver the pressurized air into the manifold 58.

The shroud-ring support 34, or inner case 34, includes a panel 60, a flange 62 on an axially forward end of the panel 60, and a plurality of mounts 63 that extends radially downward from the panel 60 as shown in FIG. 2. The panel 60 defines a radially-inner boundary of the cavity 50. The flange 62 has a generally U-shape cross section when viewed circumferentially and extends radially outward into engagement with the outer case 44 to provide the cavity 50. The plurality of mounts 63 interface with corresponding mounts 65 coupled to the turbine shroud ring 26 to mount the turbine shroud ring 26 to the shroud-ring support 34. In the illustrative embodiment, the mounts 63, 65 are generally L-shaped when viewed circumferentially, however, in other embodiments, the mounts may have any suitable shape. Additionally, one or more fasteners may be used to mount the turbine shroud ring 26 to the shroud-ring support 34.

The annular duct 56 is a tubular member to define the manifold 58 as shown in FIG. 2. The annular duct 56 is formed to include a gap 64 that extends circumferentially around the reference axis 11 with the annular duct 56. The gap 64 acts as an outlet to the manifold and opens into the cavity 50. The inner panel 54 is coupled to the annular duct and extends axially forward from the annular duct 56 into the cavity to provide the gap 64 along an axial length 66 of the inner panel 54 into the cavity 50. The inner panel 54 cooperates with the annular duct 56 to narrow the cavity 50 along the length 66. As the cavity 50 is narrowed, the pressurized air is accelerated in that area to encourage heat transfer between the pressurized air and a portion of the shroud ring support 34 corresponding to the length 66 to control blade tip clearance in that area.

The inner panel 54 may be extended or retracted axially to adjust the length 66 and, thus, the portion of the shroud-ring support 34 that is controlled. Additionally, the length or length 66 of the inner panel 54 may be increased or decreased based on the operating conditions of the particular engine in which the passive blade tip clearance control system 40 is included. In one embodiment, an amount of radial movement of the shroud-ring support 34 is related to the length 66 of the inner panel 54. For example, if more blade tip clearance is required in a particular engine, the length 66 of the inner panel 54 may be increased to provide greater heat transfer across a larger portion of the shroud ring support 34 and, thus, a larger change in diameter of the shroud ring support 34 relative to the reference axis 11. However, it should be noted that any suitable length 66 may be used depending on the particular application.

The shroud-ring support 34 may further include a plurality of turbulators 90 formed on the shroud ring support 34 as shown in FIG. 2. The turbulators 90 are positioned in the gap 64 within the length 66 of the inner panel 54 to increase the surface area of the shroud ring support 34 in that area. The turbulators 90 increase heat transfer from the pressurized air to the shroud-ring support 34 to help drive the shroud ring support 34 radially inward and outward. However, in other embodiments, the turbulators 90 may extend along the shroud-ring support 34 a greater or lesser distance than the length 66 of the inner panel 54.

The flange 62 is configured to flex to allow the shroud-ring support 34 to move radially inward and outward as the pressurized air drives movement of the shroud-ring support 34. The flange includes a radially inner flex-section 68, a radially outer flex-section 70, and a mount section 72 as shown in FIG. 2. The inner-flex section 68 is coupled to the panel 60 and extends axially forward from the panel 60. The outer flex-section 70 is coupled to the inner flex-section 68 and extends axially aft from the inner flex-section 68. The inner and outer flex sections 68, 70 are arranged at an angle 74 relative to one another to provide the generally u-shape of the flange 62. The angle 74 between the inner flex-section 68 and the outer flex section 70 increases as the diameter of the shroud-ring support 34 decreases. The angle 74 between the inner flex-section 68 and the outer flex section 70 decreases as the diameter of the shroud-ring support 34 increases. The mount section 72 extends radially outward from the outer flex-section 70 and couples to the outer case 44 to mount the shroud-ring support 34 and the turbine shroud ring 26 to the outer case 44.

In the illustrative embodiment, the passive blade tip clearance control system 40 includes a plurality of inlet conduits 42 spaced circumferentially around the central reference axis 11 as shown in FIG. 3. Each of the inlet conduits 42 is a tubular member and defines a bleed air passageway 48 that opens into the manifold 58. The pressurized bleed air is conducted into the manifold 58, through the gap 64 between the shroud-ring support 34 and the inner panel 54 of the outer case 44, and then through one or more outlets 76 where the pressurized air is then sent to the low pressure section 22 of the turbine 18. The outlet(s) 76 may be tubular members similar to the inlet conduits 42 or may be defined by the outer and/or the inner cases 44, 34 as will be described in greater detail below.

As shown in FIG. 3, in the illustrative embodiment, the outlets 76 are spaced circumferentially around the reference axis 11. The outlets 76 are tubular members defining passageways that extend axially through the manifold 58 from the cavity 50 toward the low pressure section 22 of the turbine 18. Each of the outlets 76 is spaced apart circumferentially from neighboring inlet conduits 42 so that the pressurized air travels circumferentially from the inlet conduits 42 toward the outlets 76 to deliver the pressurized air over the entire circumferential area of the shroud-ring support 34. Additionally, the outlets 76 are spaced radially outward from the inner panel 54 of the outer case 44 such that the pressurized air travels radially outward over the inner panel 54 and then through the outlets 76.

Turning again to FIG. 2, the high pressure section 20 of the turbine 18 includes a first turbine blade stage 80, a second turbine blade stage 82 axially aft of the first turbine blade stage 80, and a vane stage 84 axially between the first and second turbine blade stages 80, 82. In the illustrative embodiment, the passive blade tip clearance control system 40 is sized and located to control a blade-tip clearance gap 36 radially between second turbine blade stage 82 and the turbine shroud ring 26. As shown in FIG. 2, the second turbine blade stage 82 generally falls within the length 66 of the inner panel 54 of the outer case 44. Pressurized air traveling through the gap 64 along the length 66 drives motion of the shroud-ring support 34 to move the turbine shroud ring 26 radially inward or outward directly adjacent the second turbine blade stage 82. As previously described, the length 66 of the inner panel 54 may be increased or decreased to target additional and/or other turbine blade stages, such as first turbine blade stage 80, and control the blade tip clearance of those turbine blade stages. Additionally, the turbulators 90 facilitate heat transfer in the gap 64.

Figure 4:
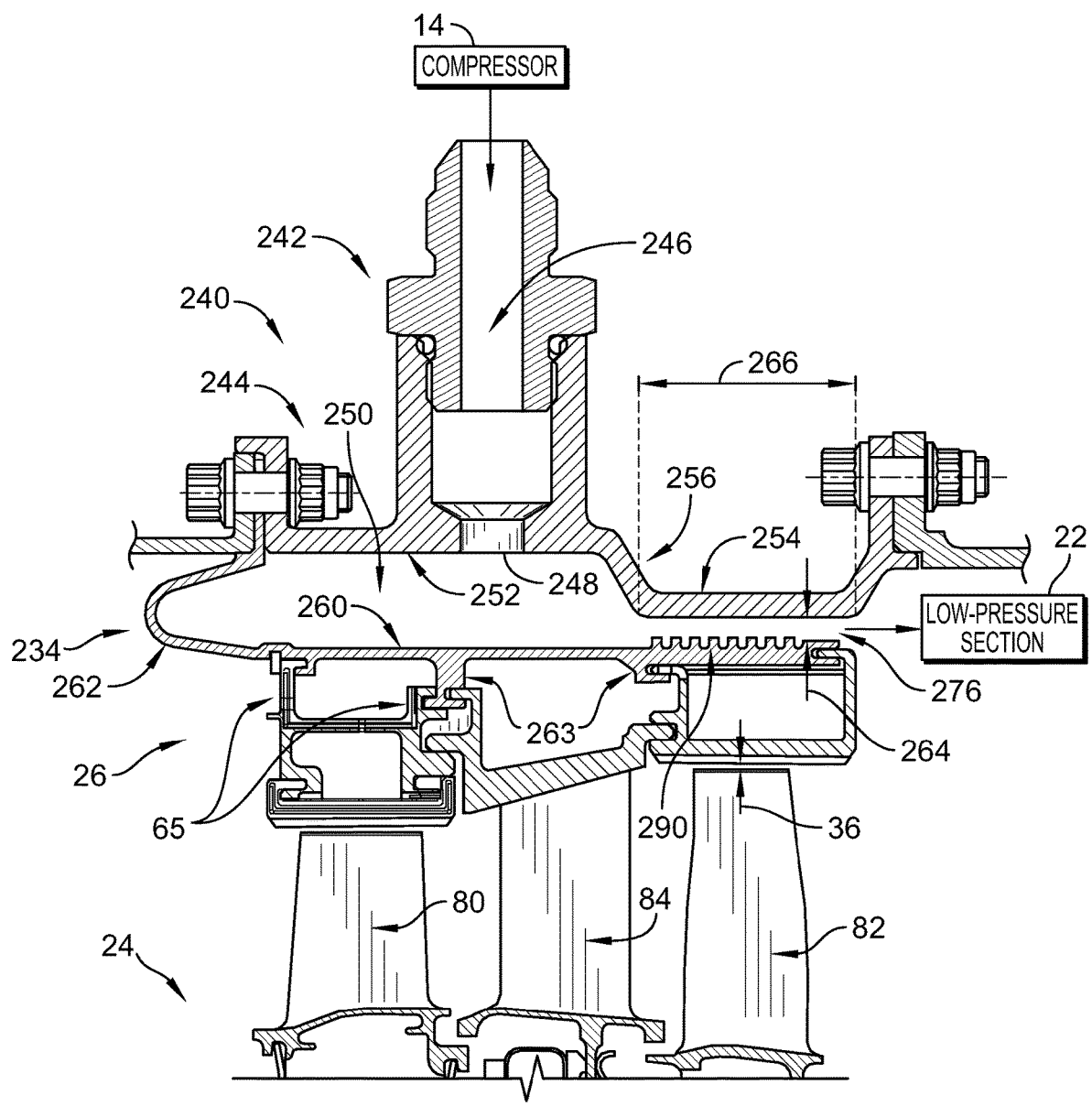
FIG. 4 is a cross sectional view of a second passive blade tip clearance control system, in accordance with the present disclosure, the passive blade tip clearance control system including an outer case and an inner case that define a cavity therebetween, and showing an inlet opening into the cavity through the outer case to conduct bleed air into the cavity and an outlet downstream of the inlet where the cavity is narrowed by the outer case to accelerate the bleed air through the outlet.

Another embodiment of a passive blade tip clearance control system 240 in accordance with the present disclosure is shown in FIG. 4. The passive blade tip clearance control system 240 is substantially similar to the passive blade tip clearance control system 40 shown in FIGS. 1-3 and described herein. Accordingly, similar reference numbers in the 200 series indicate features that are common between the passive blade tip clearance control system 40 and the passive blade tip clearance control system 240. The description of the passive blade tip clearance control system 40 is incorporated by reference to apply to the passive blade tip clearance control system 240, except in instances when it conflicts with the specific description and the drawings of the passive blade tip clearance control system 240.

The passive blade tip clearance control system 240 includes an inlet conduit 242, an outer case 244 and a shroud-ring support 234, or inner case 234. The outer case 244 and the shroud-ring support 234 define a cavity 250 radially therebetween. The inlet conduit 242 defines a bleed-air passageway 246 that is fluidly coupled between the compressor 14 and the cavity 250 without interruption from a valve or any other active blade tip clearance control device. A cooling-air passageway 247 extends from the cavity 250 to the low pressure section 22 of the turbine 18 and is also uninterrupted from a valve or active blade tip clearance device. In this way, the blade tip clearance control system 240 conducts pressurized air from the compressor 14 into the cavity 250 to control blade tip clearance in the high pressure section 20 and then reuses the air downstream of the cavity 250 in the low pressure section 22. Furthermore, the temperature and motion of the shroud-ring support 234 is controlled based on the operating conditions of the engine without active control of the pressurized bleed air provided to the cavity.

The outer case 244 includes an outer panel 252, an inner panel 254 spaced apart radially from the outer panel 252, and an linking segment 256 connecting the outer panel 252 to the inner panel 254 as shown in FIG. 4. The outer panel 252 and the inner panel 254 cooperate to define a radially-outer boundary of the cavity 250. The inner panel 254 is spaced apart radially between both the outer panel 252 and the shroud-ring support 234. The linking segment 256 extends from the outer panel 252 radially inward to the inner panel 254 at an angle to narrow the cavity 250 between the inner panel 254 and the turbine-shroud ring 234 to provide a gap 264 similarly to the passive blade tip clearance control system 40 described above.

The shroud-ring support 234, or inner case 234, includes a panel 260, a flange 262 on an axially forward end of the panel 260, and a plurality of mounts 263 that extend radially downward from the panel 260 as shown in FIG. 4. The panel 260 defines a radially-inner boundary of the cavity 250. The flange 262 has a generally U-shape cross section when viewed circumferentially and extends radially outward into engagement with the outer case 244 to provide the cavity 250. The flange 262 is configured to flex to allow the shroud-ring support 234 to move radially inward and outward as the pressurized air drives movement of the shroud-ring support 234. The plurality of mounts 263 interface with corresponding mounts 65 coupled to the turbine shroud ring 26 to mount the turbine shroud ring 26 to the shroud-ring support 234. In the illustrative embodiment, the mounts 263, 65 are generally L-shaped when viewed circumferentially, however, in other embodiments, the mounts may have any suitable shape. Additionally, one or more fasteners may be used to mount the turbine shroud ring 26 to the shroud-ring support 234.

The bleed-air passageway 246 of the inlet conduit 242 has an outlet 248 that opens into the cavity 250 through the outer panel 252 axially forward from the inner panel 254 and the linking segment 256 as shown in FIG. 4. The pressurized air flows radially through the outlet 248 and axially aft through the cavity 250 where it is accelerated between the inner panel 254 and the shroud-ring support 234 along a length 266 of the inner panel 254. The length 266 of the inner panel 254 corresponds to a portion of the shroud-ring support 234 to encourage heat transfer between the pressurized air and the shroud-ring support 234 in that area.

The inner panel 254 may be extended or retracted axially to adjust the length 266 and, thus, the portion of the shroud-ring support 234 that is controlled. The size of the outer panel 252 or the linking segment 256 may also be adjusted in view of the size of the inner panel 254. Additionally, length 266 of the inner panel 254 may be increased or decreased based on the operating conditions of the particular engine in which the passive blade tip clearance control system is included. In one embodiment, an amount of radial movement of the shroud-ring support 234 is related to the length 266 of the inner panel 254. For example, if more blade tip clearance is required in a particular engine, the length 266 of the inner panel 254 may be increased to provide greater heat transfer across a larger portion of the shroud ring support 234 and, thus, a larger change in diameter of the shroud ring support 234 relative to the reference axis 11. However, it should be noted that any suitable length 266 may be used depending on the particular application.

The shroud-ring support 234 may further include a plurality of turbulators 290 formed on the shroud ring support 234 as shown in FIG. 4. The turbulators 290 are positioned in the gap 264 within the length 266 of the inner panel 254 to increase the surface area of the shroud ring support 234 in that area. The turbulators 290 increase heat transfer from the pressurized air to the shroud-ring support 234 to help drive the shroud ring support 234 radially inward and outward. However, in other embodiments, the turbulators 290 may extend along the shroud-ring support 234 a greater or lesser distance than the length 266 of the inner panel 254.

In the illustrative embodiment, the passive blade tip clearance control system 240 includes at least one outlet 276 down steam of the gap 264 as shown in FIG. 4. The pressurized bleed air is conducted through the gap 264 between the shroud-ring support 234 and the inner panel 254 of the outer case 244 and then through the one or more outlets 276 where the pressurized air is then sent to the low pressure section 22 of the turbine 18. In the illustrative embodiment, the outlet(s) 276 are a void defined between aft ends of the outer case 244 the shroud-ring support 234.

In the illustrative embodiment, the passive blade tip clearance control system 240 is sized and located to control the blade-tip clearance gap 36 radially between second turbine blade stage 82 and the turbine shroud ring 26. The second turbine blade stage 82 generally falls within the length 266 of the inner panel 254 of the outer case 244. Pressurized air traveling through the gap 264 along the length 266 drives motion of the shroud-ring support 234 to move the turbine shroud ring 26 radially inward or outward directly outboard of the second turbine blade stage 82. As previously described, the length 266 of the inner panel 254 may be increased or decreased to target additional and/or other turbine blade stages, such as first turbine blade stage 80, and control the blade tip clearance of those turbine blade stages.

Figure 5:
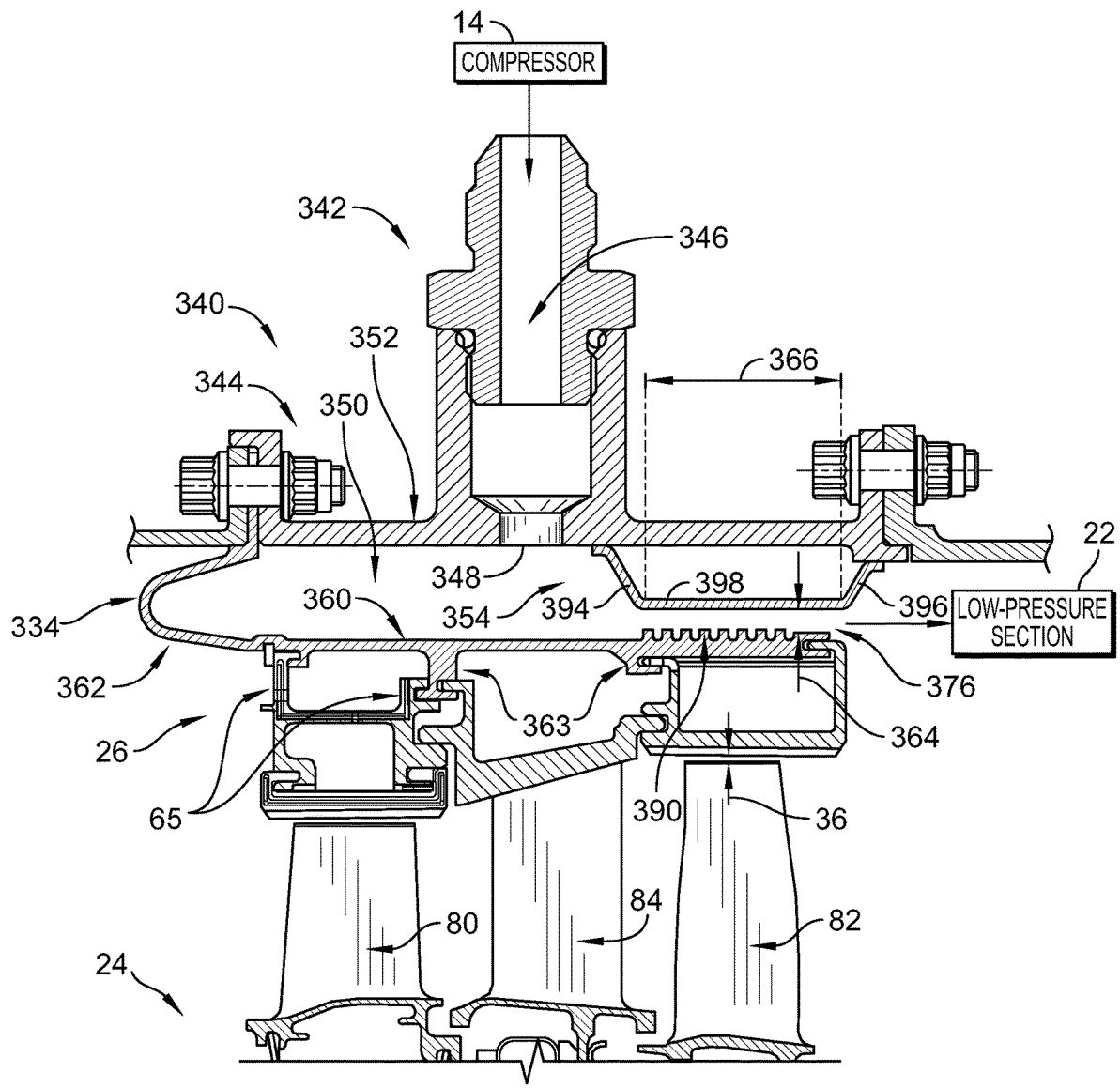
FIG. 5 is a cross sectional view of a third passive blade tip clearance control system, in accordance with the present disclosure, the passive blade tip clearance control system including an outer case and an inner case that define a cavity therebetween, and showing an inlet opening into the cavity through the outer case to conduct bleed air into the cavity and an outlet downstream of the inlet where the cavity is narrowed by a separate turbine shroud component to accelerate the bleed air through the outlet.

Another embodiment of a passive blade tip clearance control system 340 in accordance with the present disclosure is shown in FIG. 5. The passive blade tip clearance control system 340 is substantially similar to the passive blade tip clearance control system 40 shown in FIGS. 1-3 and described herein. Accordingly, similar reference numbers in the 300 series indicate features that are common between the passive blade tip clearance control system 40 and the passive blade tip clearance control system 340. The description of the passive blade tip clearance control system 40 is incorporated by reference to apply to the passive blade tip clearance control system 340, except in instances when it conflicts with the specific description and the drawings of the passive blade tip clearance control system 340.

The passive blade tip clearance control system 340 includes an inlet conduit 342, an outer case 344 and a shroud-ring support 334, or inner case 334. The outer case 344 and the shroud-ring support 334 define a cavity 350 radially therebetween. The inlet conduit 342 defines a bleed-air passageway 346 that is fluidly coupled between the compressor 14 and the cavity 350 without interruption from a valve or any other active blade tip clearance control device. A cooling-air passageway 347 extends from the cavity 350 to the low pressure section 22 of the turbine 18 and is also uninterrupted from a valve or active blade tip clearance device. In this way, the blade tip clearance control system 340 conducts pressurized air from the compressor 14 into the cavity 350 to control blade tip clearance in the high pressure section 20 and then reuses the air downstream of the cavity 350 in the low pressure section 22. Furthermore, the temperature and motion of the shroud-ring support 334 is controlled based on the operating conditions of the engine without active control of the pressurized bleed air provided to the cavity.

The outer case 344 includes an outer panel 352 and an inner panel 354 as shown in FIG. 5. The outer panel 352 and the inner panel 354 cooperate to define a radially-outer boundary of the cavity 350. The inner panel 354 is coupled to the outer panel 352 and is spaced apart radially outward of the shroud-ring support 334. The inner panel 354 is arranged to narrow the cavity 350 between the inner panel 354 and the turbine-shroud ring 334 to provide a gap 364 similarly to the passive blade tip clearance control system 40 described above.

The shroud-ring support 334, or inner case 334, includes a panel 360, a flange 362 on an axially forward end of the panel 360, and a plurality of mounts 363 that extends radially downward from the panel 360 as shown in FIG. 5. The panel 360 defines a radially-inner boundary of the cavity 350. The flange 362 has a generally U-shape cross section when viewed circumferentially and extends radially outward into engagement with the outer case 344 to provide the cavity 350. The flange 362 is configured to flex to allow the shroud-ring support 334 to move radially inward and outward as the pressurized air drives movement of the shroud-ring support 334. The plurality of mounts 363 interface with corresponding mounts 65 coupled to the turbine shroud ring 26 to mount the turbine shroud ring 26 to the shroud-ring support 334. In the illustrative embodiment, the mounts 363, 65 are generally L-shaped when viewed circumferentially, however, in other embodiments, the mounts may have any suitable shape. Additionally, one or more fasteners may be used to mount the turbine shroud ring 26 to the shroud-ring support 334.

The bleed-air passageway 346 of the inlet conduit 342 has an outlet 348 that opens into the cavity 350 through the outer panel 352 axially forward from the inner panel 354 as shown in FIG. 5. The pressurized air flows radially through the outlet 348 and axially aft through the cavity 350 where it is accelerated between the inner panel 354 and the shroud-ring support 334 along a length 366 of the inner panel 354. The length 366 of the inner panel 354 corresponds to a portion of the shroud-ring support 334 to encourage heat transfer between the pressurized air and the shroud-ring support 334 in that area.

In the illustrative embodiment, the inner panel 354 is a separate component that is mounted to a radially-inner surface of the outer panel 352 as shown in FIG. 5. The inner panel 354 includes an axially-forward segment 394, an axially-aft segment 396, and a middle segment 398 extending between the axially-forward segment 394 and the axially-aft segment 396. The axially-forward segment 394 extends radially inward at an angle relative to the reference axis 11 to the middle segment 398. The axially-aft segment 396 extends radially outward at an angle relative to the reference axis 11 from the middle segment 398 to the outer panel 352. In this way, the axially-forward segment 394 and the axially-aft segment 396 cooperate to locate the middle segment 398 in spaced-apart relation to the outer panel 352 and the shroud-ring support 334 and to narrow the cavity 350 along the length 366 of the inner panel 354. The middle segment 398 is generally parallel with the shroud-ring support 334 to provide a constant gap 364 between the middle segment 398 and the shroud-ring support 334. The segments 394, 396 may be coupled to the outer panel 352 by welding, brazing, mechanical fasteners or any other suitable means of mounting the inner panel 354 to the outer panel 352.

The inner panel 354 may be extended or retracted axially to adjust the length 366 and, thus, the portion of the shroud-ring support 334 that is controlled. More particularly, the length of the middle segment 398 is increased or decreased in some embodiments. Additionally, length 366 of the inner panel 354 may be increased or decreased based on the operating conditions of the particular engine in which the passive blade tip clearance control system is included. In one embodiment, an amount of radial movement of the shroud-ring support 334 is related to the length 366 of the inner panel 354. For example, if more blade tip clearance is required in a particular engine, the length 366 of the inner panel 354 may be increased to provide greater heat transfer across a larger portion of the shroud ring support 334 and, thus, a larger change in diameter of the shroud ring support 334 relative to the reference axis 11. However, it should be noted that any suitable length 366 may be used depending on the particular application.

The shroud-ring support 334 may further include a plurality of turbulators 390 formed on the shroud ring support 334 as shown in FIG. 5. The turbulators 390 are positioned in the gap 364 and within the length 366 of the inner panel 354 to increase the surface area of the shroud ring support 334 in that area. The turbulators 390 increase heat transfer from the pressurized air to the shroud-ring support 334 to help drive the shroud ring support 334 radially inward and outward. However, in other embodiments, the turbulators 390 may extend along the shroud-ring support 334 a greater or lesser distance than the length 366 of the inner panel 354.

In the illustrative embodiment, the passive blade tip clearance control system 340 includes at least one outlet 376 downstream of the gap 364 as shown in FIG. 5. The pressurized bleed air is conducted through the gap 364 between the shroud-ring support 334 and the inner panel 354 of the outer case 344 and then through the one or more outlets 376 where the pressurized air is then sent to the low pressure section 22 of the turbine 18. In the illustrative embodiment, the outlet(s) 376 are a void defined between aft ends of the outer case 344 the shroud-ring support 334.

In the illustrative embodiment, the passive blade tip clearance control system 340 is sized and located to control the blade-tip clearance gap 36 radially between second turbine blade stage 82 and the turbine shroud ring 26. The second turbine blade stage 82 generally falls within the length 366 of the inner panel 354 of the outer case 344. Pressurized air traveling through the gap 364 along the length 366 drives motion of the shroud-ring support 334 to move the turbine shroud ring 26 radially inward or outward directly outboard of the second turbine blade stage 82. As previously described, the length 366 of the inner panel 254 may be increased or decreased to target additional and/or other turbine blade stages, such as first turbine blade stage 80, and control the blade tip clearance of those turbine blade stages.

The present disclosure relates to a passive tip clearance control system for either high or low pressure turbines. The system may include concentric inner 34 and outer turbine cases 44. A flange 62 with a flexible connecting section may join the forward end of the inner case 34 to the forward end of the outer case 44. This arrangement may allow the cases to move independently from one another, and may create a cavity 50 between the cases in which air can be circulated to control tip clearance 36. Blade track hangers and blade tracks (collectively 26) are attached to the inner diameter of the inner case 34.

In some embodiments, a manifold 58 mounted aft of the second stage turbine blade track may receive air piped externally from the compressor 14. The manifold accelerates and directs the air over the outer surface of the inner case adjacent to the second stage blade track. The outer surface of the inner case may have turbulators 90, fins, pins, or other means of increasing the rate of heat transfer with the passing air. The arrangement of these features may be adjusted to achieve the desired response of the case and blade track relative to the rotor and blade tip. The air continues over the forward section of the inner case over the first stage blade track, then turns to flow aft against the inner surface of the outer case. Separate passages 76 in the manifold direct the air back into the circuit to be used downstream in the turbine of the engine.

In some embodiments, air piped from the compressor is fed through the outer case 244, 344. A cavity between the inner and outer cases may function as the manifold. A duct 64, 264, 364 is used to accelerate and direct the air aft over the outer surface of the inner case where it is radially aligned with the second stage blade track.

In some embodiments, the passive blade tip clearance control system may heat the case during the initial part of the mission when the thermal and mechanical growth of the rotor (or turbine wheel 24) tends to outpace the thermal growth of the case, and then cool the case during the cruise portion of the mission when the case tends to thermally expand away from the rotor. This system may open the tip clearance 36 during the initial part of the mission to avoid contact between the blades and blade track (contact may result in a permanent increase in tip clearance), and tightens the tip clearance 36 during the cruise portion of the mission to improve efficiency. The passive blade tip clearance control system may provide these effects in a simple and robust way without the need of active valves, mechanical actuators, or complex control systems that use air impingement, valves, mechanical actuation, or some combination of these to control tip clearance.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:
1. A gas turbine engine comprising
a compressor configured to pressurize air moving along a primary gas path of the gas turbine engine, a combustor fluidly coupled to the compressor to receive pressurized air discharged from the compressor and configured to ignite fuel mixed with the pressurized air, and a turbine including (i) a high-pressure section fluidly coupled to the combustor to receive combustion gases generated by fuel burned in the combustor and (ii) a low-pressure section fluidly coupled to receive the combustion gasses exiting the high-pressure section, wherein the high-pressure section includes a turbine wheel mounted for rotation about a central reference axis, a variable-diameter turbine shroud ring that extends around the turbine wheel, and a passive blade-tip clearance control system including a shroud-ring support coupled to the variable-diameter turbine shroud ring that is configured to drive motion of the turbine shroud ring radially inward or outward based on temperature of the shroud-ring support and defining at least in part a cavity located radially outward of the variable-diameter turbine shroud ring, wherein the cavity is fluidly coupled to a bleed-air passageway that extends from the compressor to the cavity without interruption from a valve and a cooling-air passageway that extends from the cavity to the low pressure section such that pressurized bleed air from the compressor is conducted to the cavity of the passive blade tip clearance control system so that the temperature and motion of the shroud-ring support is controlled based on the operating conditions of the engine without active control of the pressurized bleed air provided to the cavity, wherein the passive blade tip clearance control system further includes an outer case and the shroud-ring support is mounted radially-inward of the outer case to define the cavity radially between an inner surface of the outer case and an outer surface of the shroud-ring support so that pressurized bleed air from the compressor passes over the outer surface of the shroud-ring support, wherein the shroud-ring support includes a panel that is coupled to the turbine shroud ring and a flange coupled to an axially-forward end of the panel, the flange coupled to the outer case and having a U-shape when viewed circumferentially so that the flange is configured to flex as the shroud-ring support moves radially inward and outward relative to the outer case as the pressurized bleed air drives movement of the shroud-ring support, wherein the outer case further includes an outer panel that is concentric with the panel of the shroud-ring support and defines the inner surface of the outer case, an annular duct that extends circumferentially around the reference axis and defines a manifold in fluid communication with the bleed-air passageway, and an inner panel that extends axially forward from the annular duct at an outlet of the manifold and is located radially inward of the outer panel and radially outward of the shroud-ring support to define a gap radially therebetween that is configured to accelerate a flow of the pressurized bleed air from the manifold axially forward over the outer surface of the shroud-ring support toward the flange.

2. The gas turbine engine of claim 1, wherein the passive blade tip clearance control system further includes an inlet conduit coupled to the outer case and opening into the cavity and an outlet, the inlet configured to conduct the bleed air from the compressor into the cavity and the outlet configured to conduct the bleed air from the cavity to the low pressure section of the turbine.

3. The gas turbine engine of claim 2, wherein the passive blade-tip clearance control system is configured to heat the shroud-ring support during start-up conditions of the gas turbine engine and is configured to cool the shroud-ring support during cruise conditions.

4. The gas turbine engine of claim 1, wherein the cavity formed between the outer case and the shroud-ring support is sealed off from a gas path of the high pressure section of the turbine such that the temperature of gases within the cavity controls the gap while allowing for pressure within the cavity to be less than pressure within the primary gas path of the high pressure turbine section.

5. The gas turbine engine of claim 1, wherein the passive blade tip clearance control system includes a plurality of inlet conduits fluidly coupled to the manifold and spaced apart circumferentially around the reference axis and a plurality of outlets spaced apart circumferentially around the reference axis that extend through the manifold and are offset from each inlet conduit.

6. The gas turbine engine of claim 1, wherein the high pressure section of the turbine includes a first turbine blade stage, a second turbine blade stage axially aft of the first turbine blade stage, and a vane stage axially between the first and second turbine blade stages, and the passive blade tip clearance control system is configured to control a gap radially between second turbine blade stage and the turbine shroud ring.

7. The gas turbine engine of claim 6, wherein the outer panel is spaced apart from the central reference axis a first distance, and the inner panel is spaced apart from the central reference axis a second distance that is less than the first distance.

8. The gas turbine engine of claim 7, wherein the inner panel is positioned radially outward of the second turbine blade stage such that the cavity is narrowed outward of the second turbine blade stage.

9. The gas turbine engine of claim 7, wherein the inner panel is adjustable axially to target additional turbine blade stages included in the high pressure section of the turbine.

10. The gas turbine engine of claim 6, wherein the shroud-ring support includes a plurality of turbulators coupled to the outer surface of the shroud-ring support within the cavity radially outward of the second turbine blade stage to increase heat transfer between the bleed air and the shroud-ring support directly outward of the second turbine blade stage.

11. The gas turbine engine of claim 1, wherein the flange includes a radially inner flex-section coupled to the panel that extends axially forward from the pane, a radially outer flex-section coupled to the radially inner flex-section that extends axially aft from the radially inner flex-section, and a mount section that extends radially outward from the radially outer flex-section and couples to the outer case to mount the shroud-ring support to and the turbine shroud ring to the outer case, wherein the radially inner flex-section and the radially outer flex-section are arranged at an angle relative to one another to provide the U-shape of the flange.

12. A high pressure turbine section for use in a gas turbine engine, the turbine section comprising a turbine wheel mounted for rotation about a central reference axis, a plurality of blades that extend radially outward from the turbine wheel to interact with gases moving through a primary gas path of the turbine section, a variable-diameter turbine shroud ring that extends around the turbine wheel to define a radially-outer boundary of the primary gas path, and a passive blade-tip clearance control system configured to drive motion of the turbine shroud ring radially inward and outward relative to the central reference axis to control size of a gap radially between the turbine wheel and the variable-diameter turbine shroud ring, the passive blade-tip clearance control system including an outer case, a shroud-ring support mounted radially-inward of the outer case to define a cavity radially therebetween, and an inlet conduit coupled to the outer case, wherein the cavity formed between a radially-inwardly facing surface of the outer case and a radially-outwardly facing surface of the shroud-ring support is sealed off from the primary gas path within the high pressure turbine section, wherein the shroud-ring support includes a panel that is coupled to the turbine shroud ring and defines the radially-outward facing surface of the shroud-ring support and a flange coupled to an axially-forward end of the panel, the flange coupled to the outer case and having a U-shape when viewed circumferentially, and wherein the inlet conduit defines a bleed air passageway that opens into the cavity and is configured to conduct bleed air into the cavity across the radially-outwardly facing surface of the shroud-ring support to cause the panel to move radially inward or outward and the flange is configured to flex as the shroud-ring support moves radially inward or outward relative to the outer case as the bleed air drives movement of the shroud-ring support.

13. The high pressure turbine section of claim 12, wherein the outer case includes an outer panel spaced apart from the central reference axis a first distance, and an inner panel spaced apart from the central reference axis a second distance that is less than the first distance.

14. The high pressure turbine section of claim 13, wherein the high pressure section of the turbine includes a first turbine blade stage, a second turbine blade stage axially aft of the first turbine blade stage, and a vane stage axially between the first and second turbine blade stages, and wherein the inner panel is positioned radially outward of the second turbine blade stage such that the cavity is narrowed outboard of the second turbine blade stage.

15. The high pressure turbine section of claim 13, wherein the inner panel is adjustable axially to target additional turbine blade stages included in the high pressure section of the turbine.

16. The high pressure turbine section of claim 12, wherein the shroud-ring support includes a plurality of turbulators coupled to the radially-outwardly facing surface of the shroud-ring support within the cavity.

17. The high pressure turbine section of claim 12, wherein the panel of the shroud-ring support including an axially-aft end spaced apart axially aft of the axially-forward end of the panel that is free for radial movement relative to the outer case.

18. The high pressure turbine section of claim 12, wherein the flange includes a radially inner flex-section coupled to the panel that extends axially forward from the pane, a radially outer flex-section coupled to the radially inner flex-section that extends axially aft from the radially inner flex-section, and a mount section that extends radially outward from the radially outer flex-section and couples to the outer case to mount the shroud-ring support to and the turbine shroud ring to the outer case, wherein the radially inner flex-section and the radially outer flex-section are arranged at an angle relative to one another to provide the U-shape of the flange.

19. The high pressure turbine section of claim 18, wherein the angle between the radially inner flex-section and the radially outer flex section increases as the shroud-ring support moves radially inward in response to the bleed air flowing across the radially-outer surface of the shroud-ring support, and wherein the angle between the radially inner flex-section and radially the outer flex section decreases as the shroud-ring support moves radially outward in response to the bleed air flowing across the radially-outer surface of the shroud-ring support.

* * * * *